HOUSING AND MOUNT FOR LOUD SPEAKERS

Original Filed Oct. 26, 1960 3 Sheets-Sheet 1

INVENTOR
Nathan J. Stowell

BY Munson H. Lane
ATTORNEY

INVENTOR
Nathan J. Stowell

BY Munson H. Lane
ATTORNEY

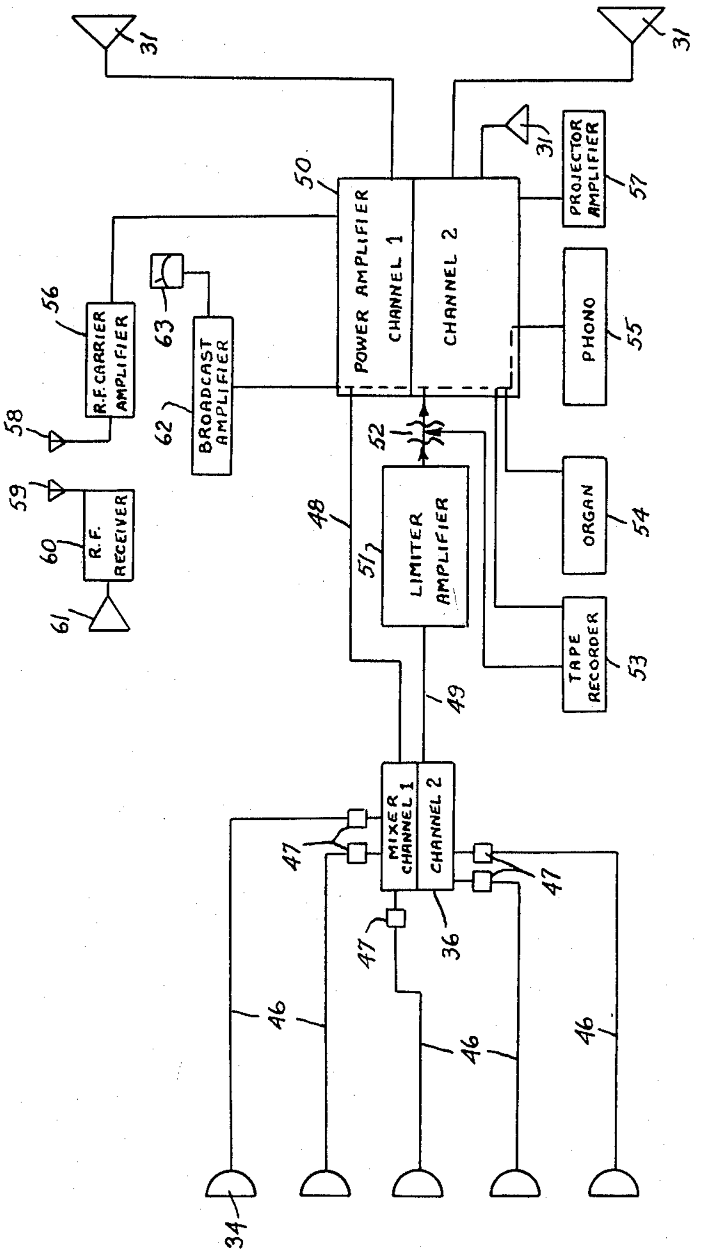
FIG. II.
INVENTOR
Nathan J. Stowell
BY Munson H. Lane
ATTORNEY

United States Patent Office 3,129,783
Patented Apr. 21, 1964

3,129,783

HOUSING AND MOUNT FOR LOUD SPEAKERS

Nathan Jerome Stowell, Jackson, Miss., assignor to James W. Hughes, Jackson, Miss.

Original application Oct. 26, 1960, Ser. No. 65,084, now Patent No. 3,115,548. Divided and this application July 26, 1961, Ser. No. 134,797
9 Claims. (Cl. 181—31)

This invention relates to new and useful improvements in lecterns, pulpits, speakers' stands, and the like, and the principal object of the invention is to provide a device of this type which, in addition to its usual facilities as a stand and book or note support, also embodies what may be broadly referred to as a public address system including a microphone, an amplifier, one or more speakers, tape recorder and/or record player, et cetera, all selectively usable and contained in an especially constructed easily portable cabinet.

The present application is a division of my earlier application Serial No. 65,084, filed October 26, 1960, entitled Lecterns, Pulpits, Speakers' Stands, and the Like.

Preferably, the cabinet in accordance with the invention is arranged to accommodate two transversely spaced speakers which may be used stereophonically, and an important feature of the invention resides in providing the cabinet with a removable casing having an open front in communication with a foraminous grille at the front of the cabinet, the casing being partitioned to provide a pair of transversely spaced speaker compartments as well as an amplifier compartment therebetween, with the afore-mentioned grille serving not only as a passage for sound waves from the speaker compartments, but also for dissipation of heat from the amplifier compartment in a forward direction, so that such heat does not cause discomfort to a speaker standing behind the lectern.

Another important feature of the invention resides in a particular arrangement of the speaker compartments which are provided with hollow, box-shaped speaker supports each defining therewithin a sound transmitting chamber which is separate from a static air chamber in the compartment rearwardly of the sound transmitting chamber, the static air chamber being airtight and loaded with static air so as to act upon the energizing mechanism of the speaker and restrict effectual frontal passage of undesirable or distortion compliance of the sound emitting mechanism of the speaker, thus controlling compliance or excursion of the sound emitting mechanism to produce only the applied electro-motive force without undesirable results of phase distortion.

Another important feature of the invention resides in the particular arrangement of the aforementioned sound transmitting chamber of each speaker compartment, such chamber being of a rectangular cross-section and forwardly divergent with a greater divergence in the horizontal than in the vertical plane, so that sound waves passing forwardly from the chamber are concentrated into an outwardly divergent beam of a rectangular cross-section with a greater horizontal than vertical spread. As such, the sound wave beams, when directed into an auditorium, are spread laterally with substantial effectiveness but are confined in a vertical direction so as to prevent them from bouncing off the auditorium ceiling and causing feed-back to the microphone at the lectern.

Some of the advantages of the invention resides in its simplicity of construction, efficient operation, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 11 is a block wiring diagram of the electrical components used in the invention.

Figure 1:
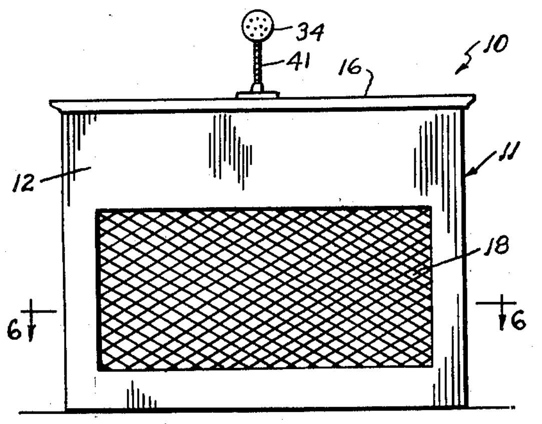
FIG. 1 is a front elevational view of a lectern in accordance with the invention.
Figure 2:
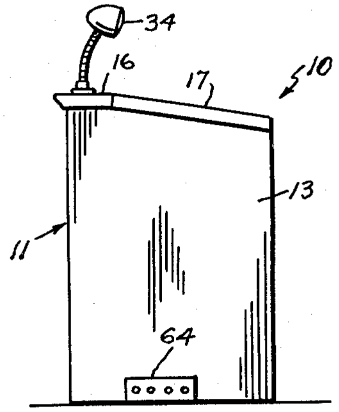
FIG. 2 is a side elevational view thereof.
Figure 3:
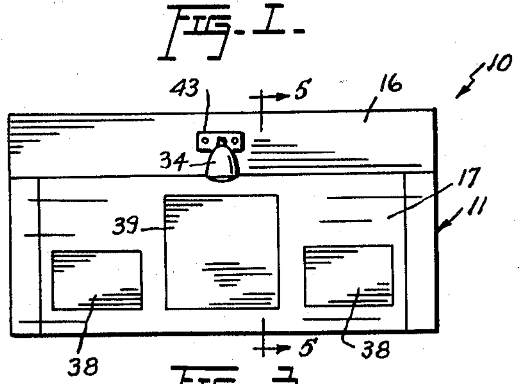
FIG. 3 is a top plan view of the same.

Referring now to the accompanying drawings in detail, the lectern in accordance with the invention is designated generally by the reference numeral 10 and comprises a cabinet 11 made of wood or other suitable material. The cabinet 11 includes a front wall 12, a pair of side walls 13, a rear wall 14, bottom 15 and a top 16, 17. The front wall 12 is provided with a relatively large, rectangular opening in which is mounted a foraminous grille 18 of the type commonly employed for covering loud speakers, and the rear wall 14 is also provided with a relatively large, rectangular opening 19. A horizontal partition 20 is provided in the cabinet flush with the upper edge of the opening 19 in the rear wall 14, whereby to provide a compartment 21 in the upper portion of the cabinet, as shown.

A horizontally elongated, boxshaped casing or housing 22 is removably positioned in the bottom portion of the cabinet 11 below the partition 20, the casing 22 being insertable and removable through the opening 19. The casing 22 has an open front which communicates with the foraminous grille 18, and the back panel 23 of the casing is flush with the rear cabinet wall 14 so as to provide a closure for the opening 19 when the casing is inserted in the cabinet. The casing 22 includes in addition to the back panel 23, a top panel 65, a bottom panel 66, a pair of opposite side panels 67, and a front wall 68 having openings 69 and 70 therein.

Figure 6:
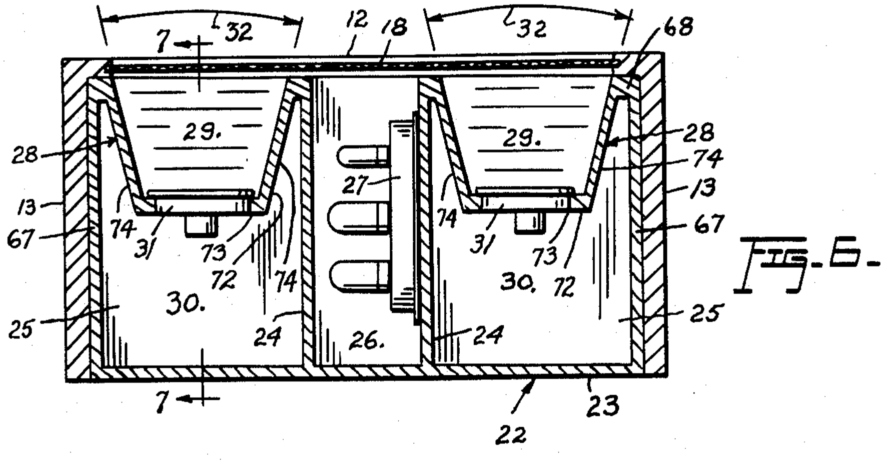
FIG. 6 is an enlarged horizontal sectional view, taken substantially in the plane of the line 6—6 in FIGS. 1 and 7.
Figure 8:
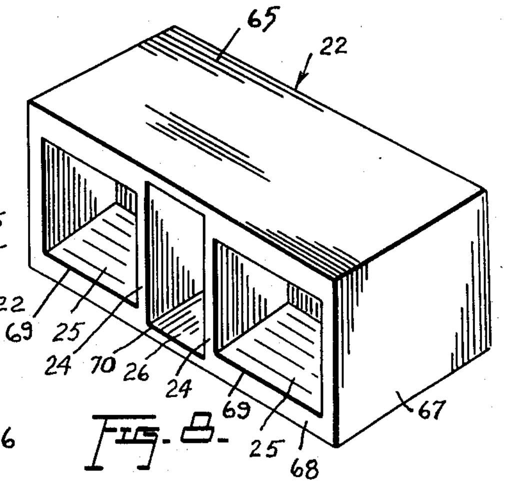
FIG. 8 is a perspective view of the casing used in the invention.

As is best shown in FIGS. 6 and 8, the casing 22 is provided with vertical partitions 24 which separate the interior of the casing into a pair of transversely spaced speaker compartments 25 and an amplifier compartment 26 therebetween. The compartment 26 accommodates a suitable amplifier unit 27 and when the same is in operation heat is dissipated therefrom through the grille 18 and forwardly from the cabinet, so that it does not cause discomfort to a speaker standing behind the lectern.

Each of the speaker compartments 25 is of general parallelepiped configuration and is encompassed by the back panel 23 of casing 22, top panel 65, bottom panel 66, a side panel 67, a partition panel 24 serving as a side panel for the speaker compartment opposite the casing side panel 67, and front wall 68 with one of the openings 69 symmetrically arranged therein with respect to the speaker compartment top, bottom and opposite side panels.

Figure 7:
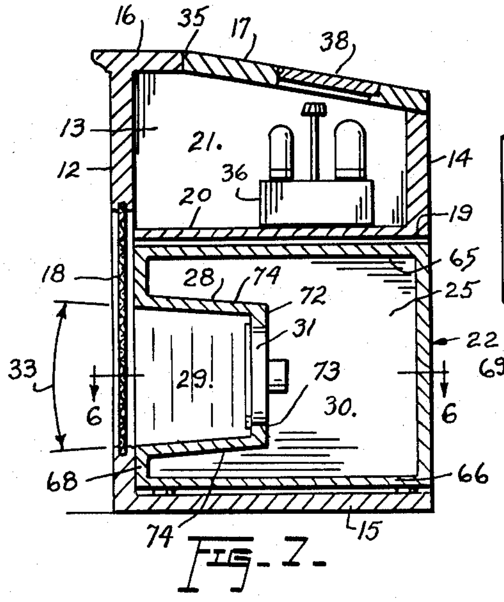
FIG. 7 is a vertical sectional view, taken substantially in the plane of the line 7—7 in FIG. 6.

Each of the speaker compartments 25 is provided with a hollow, box-shaped speaker support or mount 28 which is disposed in the compartment 25 in a re-entrant manner as shown in FIGS. 6 and 7, so as to provide a sound transmitting chamber 29 within the hollow support 28 and a static air chamber 30 in the compartment rearwardly of the chamber 29. The speaker support includes a rear wall 72 with an aperture 73 symmetrically arranged therein, side walls 74, diverging forwardly from the rear wall, and an open front at the terminous of the side walls opposite the rear wall. The open front coincides with one of the sound emitting openings 69 in the front wall of casing 22. A suitable speaker unit 31 is mounted in an aperture 73 in the rear wall 72 of each support 28 and has its front portion or sound emitting mechanism oriented forwardly into the sound transmitting chamber 29, while its rear portion or energizing mechanism is disposed in the static air chamber 30. The chamber 30 is airtight and loaded with static air which acts upon the energizing mechanism of the speaker and restricts effectual frontal passage of undesirable or distortion compliance of the sound emitting mechanism of the speaker, thus controlling compliance or excursion of the sound emitting mechanism to produce only the applied E.M.F. without undeisrable results of phase distortion.

Each sound transmitting chamber 29 is of a rectangular cross-section with forwardly divergent sides, the divergence of which in a horizontal plane as indicated at 32 being greater than the divergence in a vertical plane as indicated at 33. Thus, sound waves passing from each speaker 31 through the grille 18 are concentrated into a forwardly divergent beam of a rectangular cross-section having a greater horizontal spread than vertical spread. Accordingly, when the sound wave beams are directed into an auditorium, for example, they are spread laterally with substantial effectiveness but are confined in a vertical direction so as to prevent them from bouncing off the ceiling and causing feed-back to a microphone 34 at the lectern.

The non-parallel angular relation of the walls of the reentrant speaker mounts 28 with reference to the walls of the outer casing or housing 22 creates anechoic properties within the static air chamber 30, thereby reducing cabinet resonance within said static air chamber.

The transverse or lateral spacing of the speaker compartments 25 affords a stereophonic arrangement in a single cabinet. In actual practice the horizontal angle 32 included between the sides of the chambers 29 may be approximately 30° while the included vertical angle 33 is only about 15°, and the relatively greater horizontal spread of the sound wave beams causes them to overlap in the auditorium with effective stereophonic results.

Figure 5:
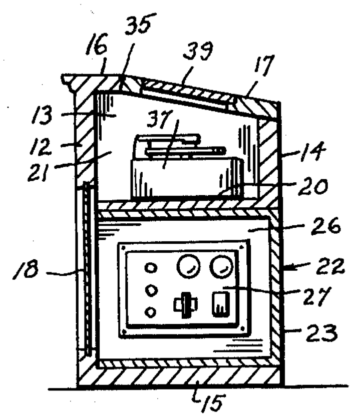
FIG. 5 is a vertical sectional view, taken substantially in the plane of the line 5—5 in FIG. 3.
Figure 4:
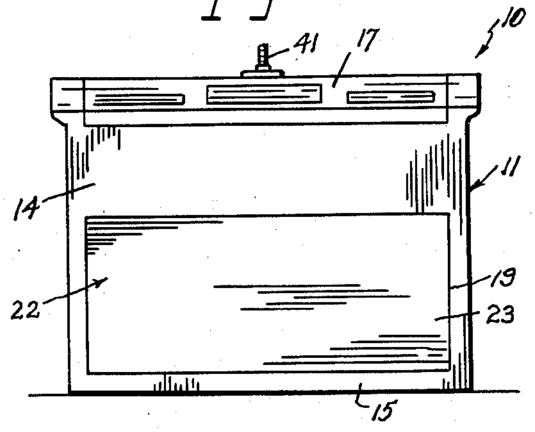
FIG. 4 is a rear elevational view.

The top of the cabinet 11 includes the aforementioned top portion 16 which is fixed and the portion 17 which slopes rearwardly and is hinged at its front edge to the portion 16 as indicated at 35, so that it may be swung upwardly for gaining access to the interior of the compartment 21. The latter compartment may contain other components of the sound reproducing system, as for example, a mixer 36 (FIG. 7), a record player or tape recorder 37 (FIG. 5), etc., these various devices being accessible through openable doors 38, 39 in the top portion 17, so that it is not necessary to open the entire top portion 17 when adjusting any one such device. It is to be noted that the grille 18 extends somewhat above the partition 20 so as to provide an air passage for dissipation of heat from the equipment in the compartment 21.

Figure 10:
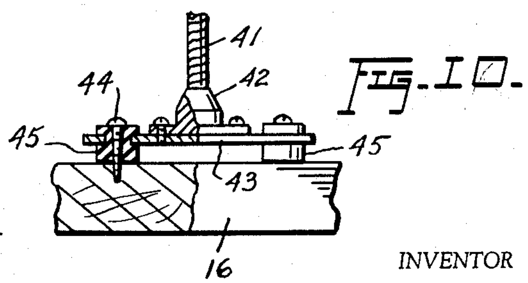
FIG. 10 is an enlarged fragmentary sectional detail of the microphone mount.
Figure 9:
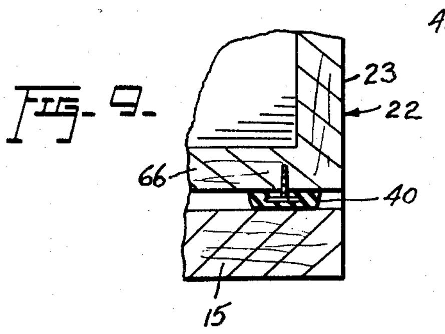
FIG. 9 is an enlarged, fragmentary sectional detail of one of the resilient casing supports.

The entire casing 22 is preferably provided at the underside thereof with resilient pads or feet 40 which rest upon the bottom 15 of the cabinet and support the casing in a cushioned manner to prevent vibration or jarring of the speakers 31 and amplifier unit 27. The microphone 34 is adjustably supported by a flexible gooseneck 41 mounted in a socket 42 on a support plate 43 which, in turn, is secured to the top portion 16 by suitable screws 44 equipped with shock-absorbing bushings 45, as shown in FIG. 10.

The versatility of my improved lectern for use in auditoriums is best shown by reference to FIG. 11, in which various component parts of the electrical system are illustrated in block form. The system exemplified in FIG. 11 by way of illustration but not limitation, is designed for stereophonic results. It is contemplated that the system includes the use of a plurality of microphones 34 which are connected to an amplifier mixer unit 36 by conductors 46 and transformers 47. The transformers 47 couple the input signal from the microphones to the input circuit of the mixer unit. For stereophonic broadcasting the mixer unit comprises two channels each of which receive signals from separate pick-up microphones. Output signals from channel 1 of the mixer are fed via conductor 48 to channel 1 of a power amplifier 50. Output signals from channel 2 of the mixer are fed via conductor 49 to a limiter amplifier 51. The output from the limiter is fed to channel 2 of the power amplifier 50 via conductor 52.

The system contemplates that signals other than from the microphones be fed to the power amplifier 50. Such signals may come from a tape recorder 53, an organ 54, or a phonograph 55. The signals from the various input sources may be fed into the power amplifier either separately or in any desired combination.

The system also contemplates that the output signals from the power amplifier be fed to various broadcasting devices, such as auditorium loud speakers 31, a radio frequency carrier amplifier 56, and projector input amplifier 57. The radio frequency carrier amplifier 56 is connected to a broadcast antenna 58 which will broadcast the voice modulated radio frequency signal to places which are remote from the auditorium in which the lectern is located. Receiving antenna 59 and receiver unit 60 detect the voice signal and broadcast the audio-frequency sound through loud speaker 61. A broadcast amplifier 62 is provided which has a visual indicator 63 for visually monitoring the broadcast signal. By using two or more loud speakers 31 in an auditorium which are connected to separate channels of the power amplifier a stereophonic effect can be produced.

While the wire connections between the component parts of the electrical system which are included in the lectern and attached thereto have not been shown in detail it will be understood that suitable wire connections are provided in accordance with the block diaphragm of FIG. 11. Sockets located in connector panel 64 in the side of the lectern are provided through which the connections to apparatus used as auxiliary to the lectern including the organ, projector amplifier, and radio frequency carrier amplifier may be made. The electrical energy for supplying the amplifiers and loud speakers may also be fed through the connector panel 64.

An important feature of my improved lectern is its ability to receive signal inputs from various selected signal sources either simultaneously or separately without excessive distortion because of feedback from the component parts. I have illustrated in FIG. 11 only one system which may be used with my lectern, but other systems, including other signal sources, amplifiers, and output signal receivers may be used within the scope of my invention.

The invention has been described in detail for the purpose of illustration but it will be obvious that numerous modifications and variations may be resorted to without departing from the spirit of the invention as defined in the accompanying claims.

What is claimed as new is:

1. In a loud speaker system, the combination of an outer casing defining at least one speaker compartment, of a hollow parallelepiped configuration having a back panel, a top panel, a bottom panel, a pair of opposite side panels and a front wall haivng a sound emitting opening symmetrically arranged within said front wall, said speaker compartment being otherwise closed, a speaker support of a hollow box-shaped configuration provided in said compartment, said speaker support having a rear wall with an aperture symmetrically arranged therein, side walls diverging forwardly from said rear wall, and an open front at the terminus of said side walls opposite said rear wall, said open front coinciding with the sound emitting opening in said casing, said speaker support defining a sound transmitting chamber therewithin having an open front and a static air chamber within said compartment separate from and rearwardly of said sound transmitting chamber, and a speaker mounted in said aperture in said rear wall of said support with its sound emitting mechanism oriented forwardly into said sound transmitting chamber and its energizing mechanism disposed in said static air chamber.

2. The device as defined in claim 1 wherein said sound transmitting chamber is of a rectangular cross-section whereby sound waves passing forwardly therefrom are concentrated into a beam of a rectangular cross-sectional form.

3. The device as defined in claim 1 wherein said sound transmitting chamber is of a rectangular cross-section with forwardly divergent sides whereby sound waves passing forwardly therefrom are concentrated into a forwardly divergent beam of a rectangular cross-sectional form.

4. The device as defined in claim 1 wherein said sound transmitting chamber is of a rectangular cross-section with forwardly divergent sides, the divergence of the sides of said chamber being greater in a horizontal plane than in a vertical plane whereby sound waves passing forwardly therefrom are concentrated into a forwardly divergent beam of a rectangular cross-section having a greater horizontal than vertical spread.

5. A housing and mount for loud speakers, comprising a box-shaped housing having an open front and being otherwise closed, and a re-entrant speaker mount provided in said housing, said speaker mount including a set of mutually convergent wall panels extending inwardly from the borders of the open front and joined thereto, a speaker support plate secured to the convergent edges of said wall panels and coacting therewith to define a sound transmitting chamber in the speaker mount having an open front at the open front of the housing, an opening in said support plate, and a speaker mounted therein facing said open front, the interior of said housing rearwardly and at the side of said mount defining a substantially anechoic static air chamber, said sound transmitting chamber and said static air chamber providing symmetrical front and rear loading for said speaker.

6. The device as defined in claim 5 wherein said speaker mount also includes a laterally projecting perimetric frame provided at the divergent edges of said wall panels and located at the open front of said housing.

7. A device as defined in claim 1 wherein a plurality of speaker supports are provided in said casing.

8. A device as set forth in claim 7 wherein the speaker supports are arranged side by side.

9. A device as set forth in claim 7 wherein the speaker supports are arranged in spaced relation to one another.

References Cited in the file of this patent

UNITED STATES PATENTS

| | | |
|---|---|---|
| 2,689,016 | Lang | Sept. 14, 1954 |
| 2,871,971 | Beecroft et al. | Feb. 3, 1959 |
| 2,872,516 | Hoffman | Feb. 3, 1959 |
| 2,878,887 | Potter | Mar. 24, 1959 |
| 2,969,848 | Farwell | Jan. 31, 1961 |

FOREIGN PATENTS

| | | |
|---|---|---|
| 319,408 | Great Britain | Sept. 23, 1929 |
| 11,700 | Australia | Apr. 9, 1934 |